United States Patent [19]
Cantello et al.

[11] Patent Number: 4,684,780
[45] Date of Patent: Aug. 4, 1987

[54] LASER BEAM FOCUSING HEAD

[75] Inventors: Maichi Cantello, Aglié; Pier Giuseppe Manino, Samone, both of Italy

[73] Assignee: R T M Istituto per le Ricerche di Tecnologia Meccanica e per l'Automazione, Italy

[21] Appl. No.: 786,845

[22] Filed: Oct. 11, 1985

[30] Foreign Application Priority Data

Oct. 19, 1984 [IT] Italy ................. 68032 A/84

[51] Int. Cl.⁴ ............................. B23K 26/06
[52] U.S. Cl. .................. 219/121 LQ; 219/121 LR; 219/121 FS
[58] Field of Search ............. 219/121 FS, 121 LP, 219/121 LQ, 121 LR, 121 LN, 121 LG, 121 LY, 121 LT

[56] References Cited
U.S. PATENT DOCUMENTS

| 3,582,466 | 6/1971 | Quirk | 219/121 LY X |
| 3,749,878 | 7/1973 | Sullivan et al. | 219/121 FS X |
| 4,048,464 | 9/1977 | Gale et al. | 219/121 FS X |
| 4,358,659 | 11/1982 | Spohnheimer | 219/121 LN X |
| 4,390,774 | 6/1983 | Steen et al. | 219/121 FS |
| 4,467,171 | 8/1984 | Ramos | 219/121 FS X |

FOREIGN PATENT DOCUMENTS 0131543 10/1979 Japan ............. 219/121 FS

Primary Examiner—C. L. Albritton
Attorney, Agent, or Firm—Kane, Dalsimer, Kane, Sullivan and Kurucz

[57] ABSTRACT

Laser beam focusing head having an unfocused-beam input, a focused-beam output and a lens located between the said input and the said output; the said head comprising a reflecting mirror between the said lens and the said output, and the said lens being located in such a position as to be directly invisible by the said output.

15 Claims, 3 Drawing Figures

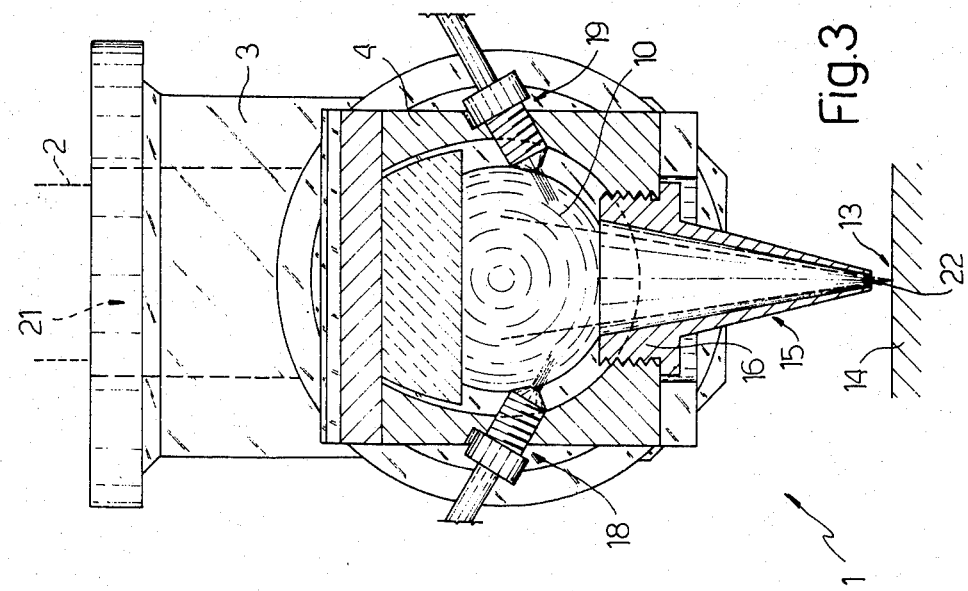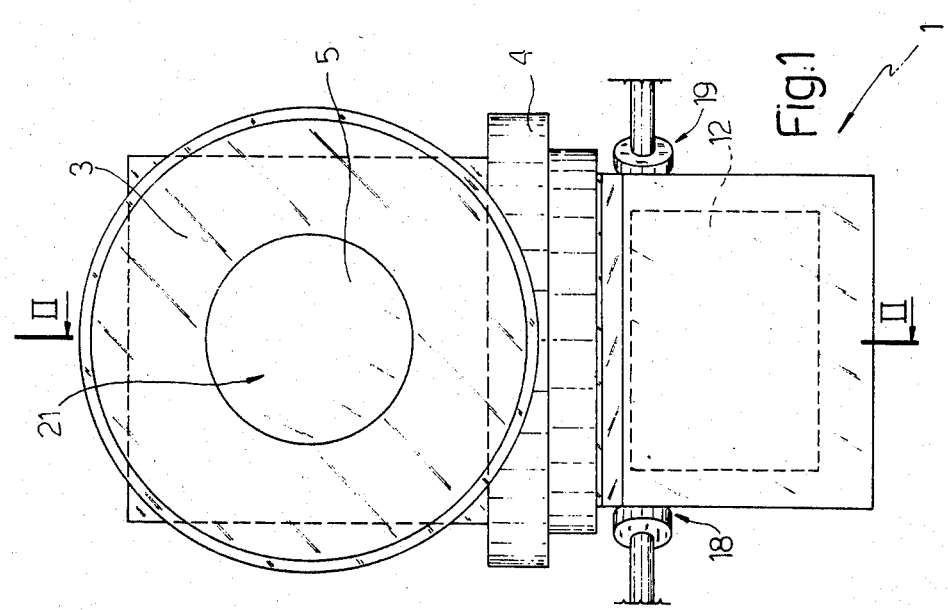

LASER BEAM FOCUSING HEAD

BACKGROUND OF THE INVENTION

The present invention relates to a laser beam focusing head, in particular, a focusing head essentially presenting a lens for focusing a laser beam, via an output, on to a given area in which, in practical use, a workpiece is located for subjection to laser beam radiation.

A serious drawback on known focusing heads of the aforementioned type is the rapid deterioration of the lens surface caused by molten material splash, vapour or fumes from the workpiece subjected to laser beam radiation. Such a drawback is particularly encountered when welding so-called "effervescent" materials, or materials reacting violently with the atmosphere or cover gas employed, e.g. aluminium, zinc, titanium or faced or composite materials with adhesives inbetween, etc. When heated violently by an incident laser beam, such materials react by giving rise to a sort of explosion in which incandescent material is splashed on to the surface of the lens. The same applies even when welding workpieces containing only a small percentage of effervescent material as, for example, in the case of coated sheet metal. When welding overlapping sheets of coated metal, the material inbetween has been found to vaporize rapidly and even to splash off part of the molten metal on the sheet itself.

The main problem resulting from such deterioration of the focusing lens is that the latter has to be changed frequently, at times, after only a few minutes' operation. As a result, focusing heads of the aforementioned type are not cheap to use; firstly, because the lens is relatively expensive as compared with the head; secondly, because of the frequent holdups required for changing the lens; and, thirdly, because even only partial damage to the lens impairs the reliability of the process as a whole.

One attempt already made to overcome the aforementioned drawback is to supply a jet of inert gas for protecting the area affected by the laser beam. As, in the case of welding, however, the said gas jet must be light enough to prevent affecting the weld pool, the force of the said jet is often insufficient for preventing incandescent material from being splashed onto the surface of the lens.

SUMMARY OF THE INVENTION

The aim of the present invention is to provide a laser beam focusing head designed to overcome the aforementioned drawback posed by known types of focusing heads. With this aim in view, the present invention relates to a laser beam focusing head having an unfocused-beam input, a focused-beam output and a lens between the said input and the said output, characterised by the fact that it comprises at least one reflecting mirror between the said lens and the said output; the said lens being located upstream from the said mirror, in such a position as to be directly invisible by the said output.

BRIEF DESCRIPTION OF THE DRAWINGS

A preferred non-limiting arrangement of the present invention will now be described with reference to the attached drawings in which:

FIG. 1 shows a top view of a focusing head according to the present invention;

FIG. 3 shows a section along line III—III in FIG. 2.

DETAILED DESCRIPTION OF THE INVENTION

Figure 2:
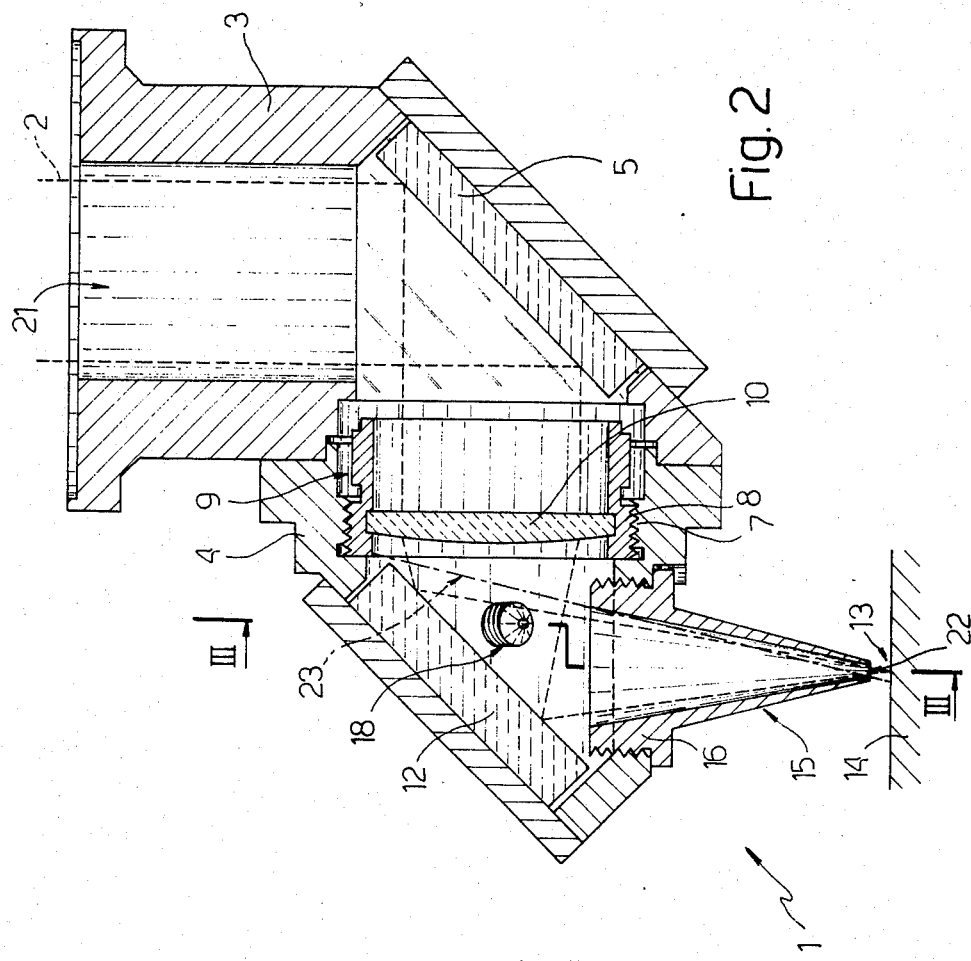
FIG. 2 shows a section along line II—II in FIG. 1.

With special reference to FIGS. 1 and 2, number 1 indicates a head for focusing a laser beam 2. The said head 1 consists essentially of a pair of tubular elements, 3 and 4, connected at respective ends in such a manner as to form a single L-shaped element. The said tubular element 3 is fitted at the bottom with a flat reflecting mirror 5 conveniently made of copper. The reflecting surface of the said mirror 5 forms a 45° angle with the propagation axis of laser beam 2 (coincident with the axis of tubular element 3), in such a manner as to reflect beam 2 by 90° on to tubular element 4. The latter presents a threaded inner portion 7 engaged by a corresponding threaded portion 8 on tubular element 9 supporting a coaxial focusing lens 10. Opposite the latter, and on the opposite side to that facing mirror 5, tubular element 4 supports a reflecting mirror 12 conveniently made of copper. The reflecting surface of the latter is inclined 45° in relation to the axis of laser beam 2 from lens 10, in such a manner as to divert the said beam by 90° on to area 13 of workpiece 14 on which a given, e.g. welding, operation is to be performed.

On the side facing the said area 13, tubular element 4 presents a hollow, essentially funnel-shaped element 15 a base portion 16 of which is threaded externally for mating with a corresponding thread on the said tubular element 4. The function of element 15 is essentially to direct, over the interacting area 13 of laser beam 2, a stream of inert gas supplied by respective nozzles 18 and 19 on element 4, on opposite sides of lens 10 and appropriately inclined towards the base portion 16 of hollow element 15.

According to the present invention, lens 10 is located inside head 1, upstream from mirror 12, more precisely, between an input 21 and an output 22 for laser beam 2, and in such a position as to be in no way directly visible by output 22. Dot-and-dash line 23, in fact, marks the maximum viewing range through output 22 in relation to lens 10. A further point to note, with reference to FIGS. 2 and 3, is that cover gas supply nozzles 18 and 19 are offset in relation to the axis of hollow element 15 so as to be closer to the surface of lens 10.

In actual use, focusing head 1 is positioned so as to focus laser beam 2 exactly on to area 13 being welded, for example. Such a position is achieved by adjusting the head itself, or by adjusting, as far as possible, the axial position of lens 10, by means of tubular element 4, or the axial position of hollow element 15 by screwing the latter more or less inside the threaded hole in which it is housed. At this point, welding may be commenced with no danger of splash deteriorating the surface of lens 10; firstly, because the said lens 10 is outside the direct reach of the said weld splash; and, secondly, because the jet of inert gas supplied from nozzles 18 and 19 tends to slow down material splash and, if necessary, direct it on to the reflecting surface of mirror 12. As the surface temperature of the latter may be kept relatively low by means of appropriate cooling, e.g. by circulating water inside mirror 12, splashed material particles are cooled rapidly and so prevented from clinging to the surface of the mirror itself. At all events, regular cleaning of the surface of mirror 12 should be sufficient.

The advantages of the focusing head according to the present invention will be clear from the foregoing description. First and foremost, it provides for efficiently guarding the focusing lens against working splash, thus practically eliminating the need for periodic replacement. What is more, the rate at which mirror 12 may be cleaned is considerably lower than the current replacement rate of lens 10. Furthermore, as replacing mirror 12, should this be necessary, is decidedly cheaper than replacing lens 10, focusing head 1 may be said to provide an essentially definite solution to the problems posed by incandescent material splash deteriorating the said focusing lens.

To those skilled in the art it will be clear that changes may be made to focusing head 1 as described herein without, however, departing from the scope of the present invention.

For example, head 1 may constitute the end portion of a five-axis laser processing system, in which case, a system could be provided for sliding and turning tubular element 3 in relation to a corresponding supporting element, as well as for turning tubular element 4 in relation to tubular element 3 and, in particular, about its own axis.

We claim:

1. A laser beam focusing head for laser welding materials which vaporize rapidly, comprising:
    an unfocused laser beam input (21) which emits an unfocused laser beam (2);
    an open-ended first support means (3) located directly downstream from said unfocused laser beam input;
    a first reflecting mirror (5) disposed on said first support means for intercepting and reflecting said unfocused laser beam from said unfocused laser beam input;
    an open-ended second support means (4) rotatably connected at its upstream end to the downstream end of said first support means;
    a lens (10) with a focal point for focussing the the laser beam intercepted and reflected by said first reflecting mirror, said lens being disposed downstream from said first reflecting mirror;
    support means for said lens disposed downstream from said first reflecting mirror;
    a second reflecting mirror (12) disposed on said second support means and downstream from said lens for intercepting and reflecting the laser beam focused by said lens;
    a focused laser beam output (22) for outputting the focused laser beam reflected by said second reflecting mirror, said focused laser beam output being connected to the downstream end of said second support means and said focused laser beam output and said lens being positioned to be at all times directly invisible from each other; and
    means for rotating one of said first or second support means in relation to the other.

2. Focusing head according to claim 1, characterized by the fact that the said laser beam output (22) is located at the small-diameter end of a hollow, essentially funnel-shaped element (15) connected to the downstream end of said second support means (4).

3. Focusing head according to claim 2, characterised by the fact that the function of the said hollow element (15) is to direct a cover gas towards an area (13) on to which the said laser beam (2) is focused.

4. Focusing head according to claim 3, characterised by the fact that it comprises means for supplying the said cover gas, the said means being located downstream from the said lens (10) and designed to direct a jet of gas towards the said output (22).

5. Focusing head according to claim 4, characterized by the fact that the said cover gas supply means comprises a pair of nozzles (18,19) fitted inside said second support means (4) and located essentially halfway between the axis of said hollow element (15), which axis is parallel to the surface of said lens (10), and the surface of said lens (10).

6. Focusing head according to claim 1,
    characterised by the fact that the said second reflecting mirror (12) is inclined by a given preset angle in relation to the propagation axis of the said focused laser beam from the said lens (10).

7. Focusing head according to claim 6, characterised by the fact that the said given preset angle is an angle of 45°; the said second reflecting mirror thus diverting by 90° the said focused laser beam (2) from the said lens (10).

8. Focusing head according to claim 1, characterized by the fact that said lens (10) and said second reflecting mirror (12) are supported by a single, essentially tubular first element (4) which comprises said second support means.

9. Focusing head according to claim 8, characterized by the fact that it comprises means (8) for adjusting the axial position of the said lens (10) in relation to the said tubular first element (4).

10. Focusing head according to claim 1, characterised by the fact that the reflecting surface of the said first mirror (5) forms a given preset angle with the propagation axis of the said laser beam (2).

11. Focusing head according to claim 10, characterised by the fact that the said given present angle is an angle of 45°, thus providing for diverting the said unfocused beam (2) hitting the said first mirror (5) by 90° on to the said lens (10).

12. Focusing head according to claim 1, characterized by the fact that said first reflecting mirror (5) is supported at one end of a tubular second element (3), which element comprises said first support means, having said input (21) at the opposite end.

13. Focusing head according to claim 12, characterized by the fact that a single, essentially tubular first element (4) comprises said second support means and supports said lens (10) and further characterized by the fact that it comprises means for turning said tubular first element (4) about its own axis and in relation to said tubular second element (3) supporting said mirror (5).

14. Focusing head according to claim 13, characterized by the fact that it comprises means for axially sliding and turning said tubular second element (3) supporting said first reflecting mirror (5) whereby said focusing lens (10), which is supported by said tubular first element (4) which is rotably connected to said tubular second element (3), is axially shifted for shifting said focal point.

15. The focusing head of claim 1 wherein said first and second mirrors deflect the laser beam by 90° whereby the unfocused laser beam entering the input and the focused laser beam exiting the output have parallel axes.

* * * * *